UNITED STATES PATENT OFFICE.

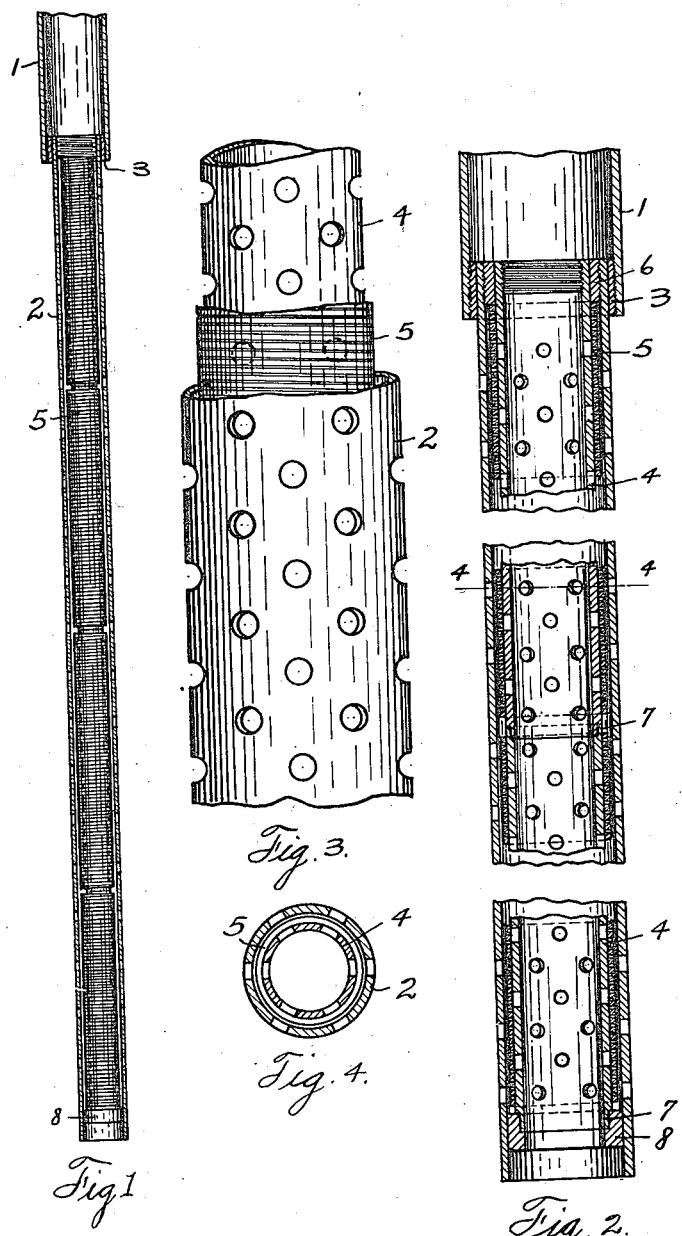

JAMES O. MACK, OF HOUSTON, TEXAS.

WELL-SCREEN.

1,305,915.    Specification of Letters Patent.    Patented June 3, 1919.

Application filed February 5, 1919. Serial No. 275,091.

*To all whom it may concern:*

Be it known that I, JAMES O. MACK, a citizen of the United States, residing at Houston, in the county of Harris and State of Texas, have invented certain new and useful Improvements in Well-Screens, of which the following is a specification.

This invention relates to new and useful improvements in a well screen.

In the production of oil, a pipe is usually let down into the bore, through which the oil is pumped or forced by pressure to the surface of the ground. It is customary to attach to the lower end of this pipe, a well screen, which is set in the oil bearing strata, in the bore. This screen is provided for the purpose of admitting the oil into the same, and excluding sand and other detritus therefrom. Screens of various forms are in common use, one form of screen being composed of a perforated pipe which is wrapped with screen wire, the turns of the wire being spaced apart to permit the inflow of the fluid. After the screen has been set in the bore for a period of time, the slits often become partially or wholly clogged up, so as to restrict or entirely shut off the inflow of the fluid, and unless the screen can then be withdrawn and cleaned and reset, or a new one substituted therefor, the well will be lost. With the forms of screens now in common use, it is almost impossible to withdraw the same and clean and reset them, and it is very difficult to wash out and clean a screen while the same is in the bore. So on account of the difficulties recited, oil wells often become nonproductive before the oil has become exhausted from the surrounding strata. It is the object of this invention to provide a screen which may be readily set in a well, and which will not easily be clogged up, but which may be removed and cleansed and reset, or a new one substituted therefor, in case the same should become clogged up.

Another object of the invention is to provide a screen of the character described, which will be comparatively cheap and simple in construction, and which may be easily assembled and set in a bore and withdrawn therefrom.

A further object of the invention resides in the provision of a screen of the character described, which can be readily set in the bore without injury to, or displacement of the screen wire, or other screening surface.

A further feature of the invention resides in the provision of a screen of the character described, in which the surrounding jacket will prevent the screen wire from becoming unwrapped in case said wire should become broken.

A still further feature of the invention resides in the provision of a screen of great strength, and which will resist gas pressure and will not be collapsed thereby.

With the above and other objects in view, the invention has particular relation to certain novel features of construction, arrangement of parts, and use, an example of which is given in this specification and illustrated in the accompanying drawings, wherein:

Figure 1, shows the assembled screen with the surrounding jacket shown in longitudinal section.

Fig. 2, is a longitudinal sectional view of the complete device.

Fig. 3, is an enlarged fragmentary side elevation, and,

Fig. 4, is a transverse sectional view, taken on the line 4—4 of Fig. 2.

Referring now more particularly to the drawings, wherein like numerals of reference designate similar parts in each of the figures, the numeral 1, refers to a pipe, to the lower end of which the screen is attached. This pipe is let down into the bore and extends to the surface of the ground. A screen is set in the oil bearing strata of the bore, the bottom thereof, usually resting upon the bottom of the bore. The numeral 2, refers to a surrounding tubular jacket perforated throughout its length and swaged upon the upper end thereof, is the collar 3, which is outwardly threaded, being provided with right hand threads, and upon which the lower end of the pipe 1 is screwed. Within this jacket and spaced a suitable distance therefrom, is the screen pipe, which is formed of a plurality of tubular joints 4. Any number of joints may be employed, depending upon the thickness of the oil bearing strata. These joints are perforated and wrapped with screen wire 5, the turns of which are spaced apart to permit the oil to flow in between them. Swaged upon the upper end of the upper section 4, is the collar 6, having exterior left hand threads, adapted to be screwed into corresponding threads in the upper end of the jacket 2. The lower end of each section 4 is reduced, forming a nipple as 7, and the upper end of each section, immediately beneath, has an annular recess into which said nipple fits, thus forming a tight joint between the sections. However, the lower end of the lower section fits into an annular recess, formed in the seat 8, which is driven into the lower end of the jacket 2.

When the screen becomes clogged, and it becomes necessary to remove the same, a fishing tool is let down through the pipe 1, and engaged with the upper end of the upper section 4. This tool is then rotated forwardly, which causes the collar 6 to unscrew from the jacket 2. During this operation, there will be no danger of unscrewing the jacket 2, from the pipe 1, inasmuch as the threads connecting the same are right hand threads, and they will be screwed together all the tighter. When the collar 6 has been unscrewed, the upper section 4 of the screen may be then lifted out and the fishing tool then again let down and engaged with the next section, which may be easily lifted out, and so on, the sections may be all removed singly and cleaned and replaced, or a new set of sections of screen may be substituted for them.

During this operation, there will be no danger of stripping the screen wire, as the same, is, at all times, protected in the pipe, and when once set, the screen will not give way, or collapse under heavy gas pressure, inasmuch as it is protected by the surrounding jacket 2, and in removing and replacing the screen, there will be no danger of the hole caving in, or being lost, inasmuch as the surrounding jacket preserves the uniformity of the bore, so that the screen may be readily reset, thus preserving the well as long as there is any oil to be produced from the oil bearing strata.

What I claim is:

1. A well screen, including a tubular perforated jacket, screen sections, each being formed of perforated pipe, the perforations thereof being covered with screening, said sections being fitted together and inclosed by said jacket, and being removable independently therefrom.

2. A well screen, including a perforated tubular jacket, a seat provided in the lower end thereof, a screen within said jacket formed of independent tubular perforated sections, each being wrapped with screen wire, the adjacent sections being detachably secured together, and the lower section resting upon said seat, and means for securing the upper section in said jacket.

3. A well screen, including an outer perforated jacket, a screen secured therein, said screen being formed of independent sections, a fixed seat in the lower end of said jacket, upon which the lower section rests, and a collar fixed upon the upper end of the upper section which is screwed into the upper end of said jacket, the adjacent ends of said sections being detachably secured together by means of a nipple, formed on one end of one section, which fits into a recess formed in the adjacent end of the adjoining section.

4. A device of the character described, including an outer perforated jacket, a screen within said jacket formed of detachable sections, a reduced nipple carried by one end of each section, the adjacent end of the adjoining section being provided with a recess to receive said nipple, thereby detachably securing the adjoining sections together.

5. A device of the character described, including an outer perforated jacket, a screen within said jacket, formed of detachable sections, a reduced nipple carried by one end of each section, the adjacent end of the adjoining section being provided with a recess to receive said nipple, thereby detachably securing the adjoining sections together, and a seat fixed in the lower end of said jacket upon which the lower section rests, and a collar secured upon the upper end of the upper section which is threaded into the upper end of said jacket by left hand threads.

In testimony whereof I have signed my name to this specification in the presence of two subscribing witnesses.

JAMES O. MACK.

Witnesses:
 E. V. HARDWAY,
 WM. DAVIES.